US012668019B2

(12) United States Patent
Schäfer

(10) Patent No.: US 12,668,019 B2
(45) Date of Patent: Jun. 30, 2026

(54) METHOD AND APPARATUS FOR STRETCHING PLASTIC FILMS

(71) Applicant: BB Engineering GmbH, Remscheid (DE)

(72) Inventor: Klaus Schäfer, Remscheid (DE)

(73) Assignee: BB ENGINEERING GMBH, Remscheid (DE)

( * ) Notice: Subject to any disclaimer, the term of this patent is extended or adjusted under 35 U.S.C. 154(b) by 200 days.

(21) Appl. No.: 18/272,837

(22) PCT Filed: Feb. 4, 2022

(86) PCT No.: PCT/EP2022/052677
§ 371 (c)(1),
(2) Date: Jul. 18, 2023

(87) PCT Pub. No.: WO2022/171532
PCT Pub. Date: Aug. 18, 2022

(65) Prior Publication Data
US 2024/0075678 A1      Mar. 7, 2024

(30) Foreign Application Priority Data

Feb. 11, 2021    (DE) ..................... 10 2021 000 710.7

(51) Int. Cl.
*B29C 55/16*        (2006.01)
*B29C 48/00*        (2019.01)
(Continued)

(52) U.S. Cl.
CPC ........ *B29C 55/165* (2013.01); *B29C 48/0018* (2019.02); *B29C 48/08* (2019.02); *B29C 55/023* (2013.01); *B29C 55/16* (2013.01);

*B29C 55/20* (2013.01); *B29K 2023/00* (2013.01); *B29K 2067/00* (2013.01)

(58) Field of Classification Search
CPC ............ B29C 55/02–20; B29C 55/023; B29C 48/0022; B29C 48/16; B29C 48/21; B29C 48/23; B29C 55/12; B29C 55/16; B29C 55/165
See application file for complete search history.

(56) References Cited

U.S. PATENT DOCUMENTS 3,114,929 A * 12/1963 Prietzschk .............. B29C 55/02
                                                    26/72
3,380,868 A *  4/1968 Moser ................. B32B 38/0012
                                                    156/229
(Continued)

FOREIGN PATENT DOCUMENTS

WO        2014094803 A1      6/2014

*Primary Examiner* — Jeffrey M Wollschlager
(74) *Attorney, Agent, or Firm* — BainwoodHuang

(57)        ABSTRACT

A method and an apparatus are directed to stretching plastic films. The plastic film is held at at least two opposite longitudinal sides by a plurality of holding means and the holding means are guided along stretching paths at both longitudinal sides of the plastic film. In order to increase productivity, several plastic films are held, mutually spaced one on top of the other, by the holding means and are simultaneously stretched. The holding means, in terms of their number and/or design, are constructed and arranged such that several plastic films can be simultaneously stretched mutually spaced one on top of the other.

7 Claims, 4 Drawing Sheets

(51) Int. Cl.
    *B29C 48/08*         (2019.01)
    *B29C 55/02*         (2006.01)
    *B29C 55/20*         (2006.01)
    *B29K 23/00*         (2006.01)
    *B29K 67/00*         (2006.01)

(56)             References Cited

U.S. PATENT DOCUMENTS

| | | | | |
|---|---|---|---|---|
| 3,416,986 | A | * | 12/1968 | Lucille .................... B32B 27/00 |
| | | | | 156/244.18 |
| 3,547,768 | A | * | 12/1970 | Layne .................... B32B 27/00 |
| | | | | 426/127 |
| 3,611,479 | A | * | 10/1971 | Wicksall .............. B29C 55/165 |
| | | | | 26/72 |
| 4,017,227 | A | * | 4/1977 | Schmidt ............... B29C 55/023 |
| | | | | 425/DIG. 53 |
| 4,058,582 | A | * | 11/1977 | Bierenbaum ......... B29C 55/023 |
| | | | | 264/154 |
| 4,076,785 | A | * | 2/1978 | Schmidt ............... B29C 55/023 |
| | | | | 264/157 |
| 7,200,904 | B2 | * | 4/2007 | Randem .................. D06C 3/02 |
| | | | | 26/89 |
| 7,820,080 | B2 | * | 10/2010 | Mizushima .......... G02B 5/3033 |
| | | | | 264/2.6 |
| 2006/0115548 | A1 | * | 6/2006 | Marchante Moreno .................... B29C 55/165 |
| | | | | 425/66 |
| 2011/0039084 | A1 | * | 2/2011 | Maki ....................... B29C 55/08 |
| | | | | 428/220 |
| 2012/0211150 | A1 | * | 8/2012 | McAllister, Jr. ........ B29C 55/06 |
| | | | | 156/229 |
| 2022/0105719 | A1 | * | 4/2022 | Ye ....................... B32B 38/0012 |

* cited by examiner 17.2   17.1   18.1   18.2   17.1   17.2
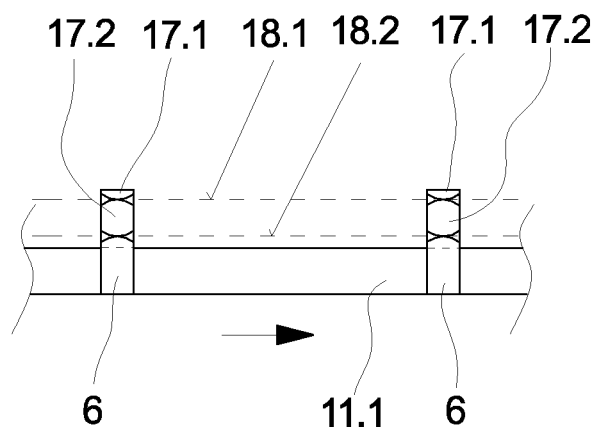
6            11.1    6
Fig.4.1
17.2   17.1   18.1   18.2   17.2   17.1
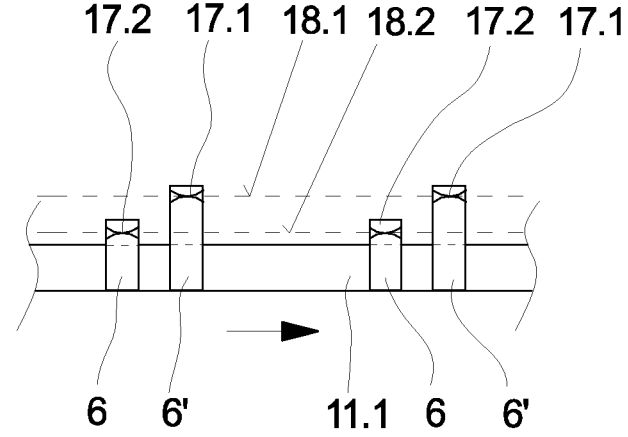
6   6'        11.1   6    6'
Fig.4.2

METHOD AND APPARATUS FOR STRETCHING PLASTIC FILMS

The invention relates to a method for stretching plastic films and to an apparatus for stretching plastic films as disclosed herein.

A method of this type and an apparatus of this type for stretching plastic films are known, for example, from WO 2014/094803 A1.

In the production of plastic films, it is known that the mechanical properties, for example flexibility, specific strength and extensibility, are influenced by material stretching. Thus, the molecular structure of the plastic material may be modified by stretching the plastic film. By simultaneous longitudinal and transverse stretching, for example, the molecules become ordered to form a lattice, so that the mechanical properties are positively modified. Thus, it is furthermore known to carry out longitudinal stretching of a plastic film and transverse stretching of a plastic film successively or simultaneously. Particularly for the transverse stretching, it is necessary for the plastic film to be fixed on opposite longitudinal sides by holding means, which are then guided on both sides of the plastic film along extension paths by means of drive systems.

Such a method and such an apparatus are disclosed in WO 2014/094803 A1. So-called vises are in this case used as holding means, which are guided by means of a revolving chain drive along an extension path. Such extension paths may in this case extend over a length of for example 70 m, in order to obtain particular film qualities and film widths of for example 10 m. It is in this case necessary for the plastic film to be heated to a predetermined desired stretching temperature. Very complex and bulky devices are therefore needed in order to stretch the plastic films. Furthermore, the production rate is limited because of the drive systems being configured to be correspondingly long.

It is now an object of the invention to further develop the method of this type and the apparatus of this type for stretching plastic films, in such a way that a higher production output for the production of plastic films is possible.

A further aim of the invention is to provide a method and an apparatus for stretching plastic films, with which space-saving and compact production processes may be achieved.

This object is achieved according to the invention for a method in that a plurality of plastic films are held at a distance above one another and stretched simultaneously by the holding means.

For the apparatus according to the invention, the solution is achieved in that the holding means are configured in terms of their number and/or their layout in such a way that a plurality of plastic films can be stretched simultaneously at a distance above one another.

Advantageous further developments of the invention are defined by the features and feature combinations which are disclosed herein.

The term "stretching" is to be understood here as extension beyond the elastic limit. Thus, not all extension is stretching. The stretching may be transverse stretching and/or longitudinal stretching. In the case of transverse stretching, the film is stretched in a direction transverse to the movement direction. In the case of longitudinal stretching, the film is stretched in a direction parallel to the movement direction. In the case of transverse and longitudinal stretching, a superposition of these two stretching processes takes place. Properties, for example flexibility, specific strength and extensibility, may be influenced by the stretching. The molecular structure of the material of the film is modified by the stretching. By simultaneous longitudinal and transverse stretching, for example, the molecules become ordered to form a lattice, so that the mechanical properties are positively modified.

The invention obviates the precondition that flat plastic films need to be guided in a treatment plane in order to achieve desired physical properties, so as to obtain uniform properties over the entire surface of the plastic film. This precondition is widely known in the technical field, and does not relate only to continuous processes. The invention has revealed that the essential physical properties of the plastic film are generated during stretching under heat treatment. By the method according to the invention and the apparatus according to the invention, a plurality of treatment planes may thus be achieved during the stretching. To this end, one of the plastic films is guided in each of the treatment planes. A plurality of plastic films may therefore be held at a distance above one another and stretched simultaneously by the holding means. The holding means may in this case be correspondingly configured in terms of their number or their layout in order to guide a plurality of plastic films simultaneously at a distance above one another in the treatment planes. The treatment planes in this case preferably extend parallel to one another.

It has been found to be particularly advantageous for at least five, in particular at least ten, holding means respectively to be provided on each side of each of the plastic films. Preferably, at least ten holding means, in particular at least 20 holding means, are respectively provided for each extension path.

The holding means are physical objects that can be brought in contact with the plastic film. For example, a holding means may be configured as a block, a rib, a bar or a rod. The individual holding means are spatially separated from one another. The effect of the holding means is that the plastic films are respectively held not only on one single continuous contact face.

The method variant in which the plastic films are formed by dividing a stock film in a continuous extrusion process and are stretched is particularly advantageous in order to obtain short and compact extension zones for the stretching of the plastic films. Thus, for example, the extension widths may already be halved by a single division of the stock film, in order to obtain the same physical properties as conventional films.

To this end, the further development of the apparatus according to the invention in which an extrusion apparatus for producing a stock film and a cutting device are provided, by which a stock film can be divided into a plurality of plastic films and delivered to the holding means, is particularly advantageous. Thus, a plurality of plastic films may be stretched together from a stock film. The extrusion apparatus is preceded by a melt generator in the form of an extruder or a polycondensation unit.

The method variant in which the plastic films are extruded separately and are combined at a distance above one another for the stretching is preferably used in order to achieve maximum production outputs in the production of films. Thus, a plurality of freshly extruded plastic films may be directly stretched longitudinally and/or transversely together in a stretching unit.

For this purpose, the further development of the apparatus according to the invention in which a plurality of extrusion apparatuses for producing a plurality of plastic films are provided, which plastic films can be delivered to the holding means, is preferably used. The extrusion apparatuses may be preceded by a plurality of melt generators or only a single common melt generator.

The way in which the plastic films guided on the holding means are stretched depends on the layout of the extension paths and on the drive system of the holding means. To this extent, the method variant in which the plastic films are stretched longitudinally and/or transversely by moving the holding means along the extension paths offers flexible adjustment opportunities. Preferably, the plastic films are produced simultaneously with longitudinal and transverse stretching.

To this end, the extension paths comprise a plurality of path sections for guiding the holding means, at least one of the path sections causing a longitudinal extension of the plastic films and/or a transverse extension of the plastic films.

In order to obtain identical physical properties as far as possible on all the plastic films, the method variant in which the plastic films are stretched synchronously by moving the holding means along the extension paths is preferably carried out. In this way, it is possible to ensure that the same extension forces are generated by the holding means in each of the treatment planes.

To this end, the holding means are guided synchronously in the two extension paths by separate drive systems.

Heat treatment of the plastic film may be ensured by the method variant in which the plastic films are stretched inside an oven. To this end, the extension paths are arranged at least partially inside an oven, so that the desired subsections of the plastic films can be heat-treated before the stretching, during the stretching or after the stretching.

The plastic films guided above one another in the treatment planes are preferably guided together via the holding means assigned to one of the longitudinal sides of the plastic films by a drive system along the relevant extension path.

Alternatively, however, it is also possible for the longitudinal sides of the plastic films to be held by separate holding means for each plastic film. Thus, for example, the plastic films may be stretched in the treatment planes with different settings in terms of speed by additional separate drive systems of the holding means.

In order to stretch a plurality of plastic films with the least possible equipment outlay, the further development of the apparatus according to the invention in which the holding means guided in one of the extension paths comprise a plurality of clamping positions above one another is particularly advantageous. Thus, one plastic film per clamping position may respectively be fixed on the holding means.

Alternatively, it is however also possible for the holding means guided in one of the extension paths to alternately comprise lower and upper clamping positions. Thus, each of the plastic films may be assigned separate holding means for fixing.

The method according to the invention and the apparatus according to the invention for stretching plastic films may advantageously be used for the simultaneous stretching of a plurality of plastic films, in particular flat films. Preferably, two or three plastic films arranged above one another, for example consisting of a polyester or polyolefin, are stretched simultaneously.

For further explanation of the invention, some exemplary embodiments of the apparatus according to the invention for stretching plastic films will be explained in more detail below with reference to the appended figures.

FIG. 4.1 and

Figure 1:
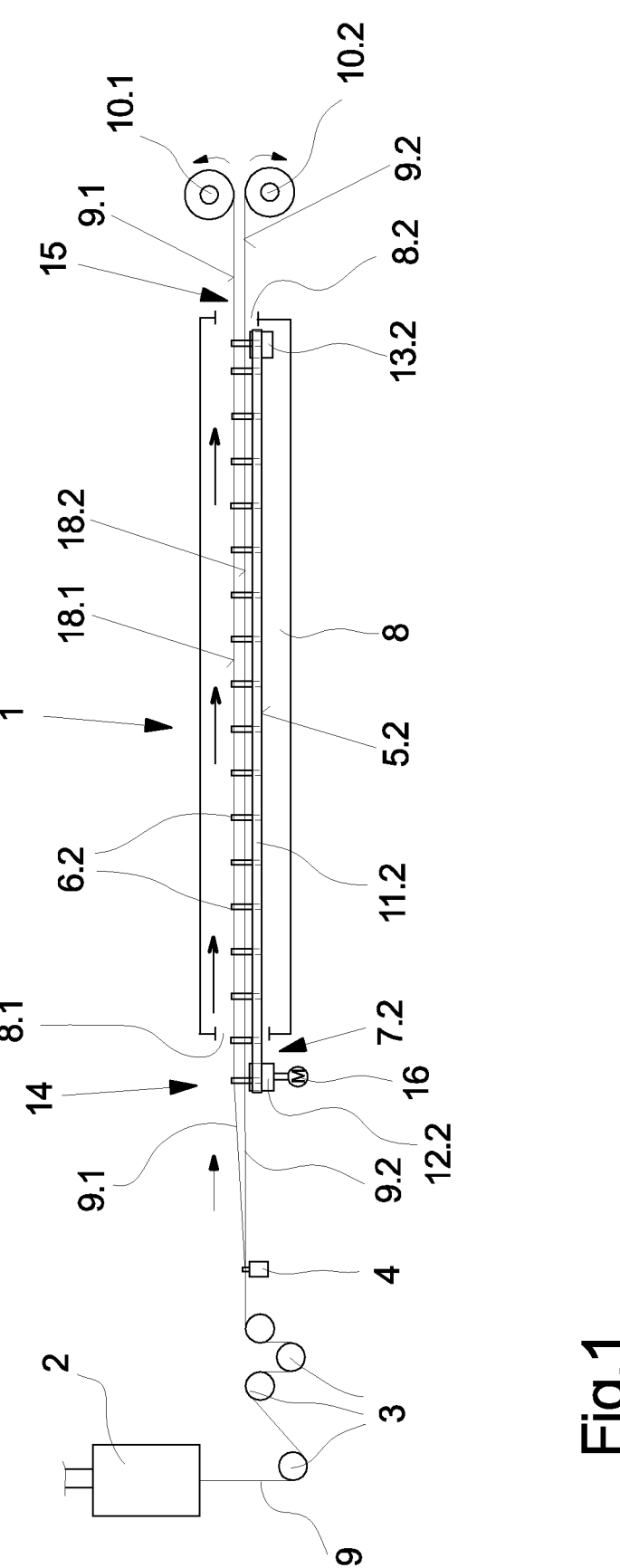
FIG. 1 shows a schematic side view of a first exemplary embodiment of the apparatus according to the invention for stretching plastic films
Figure 2:
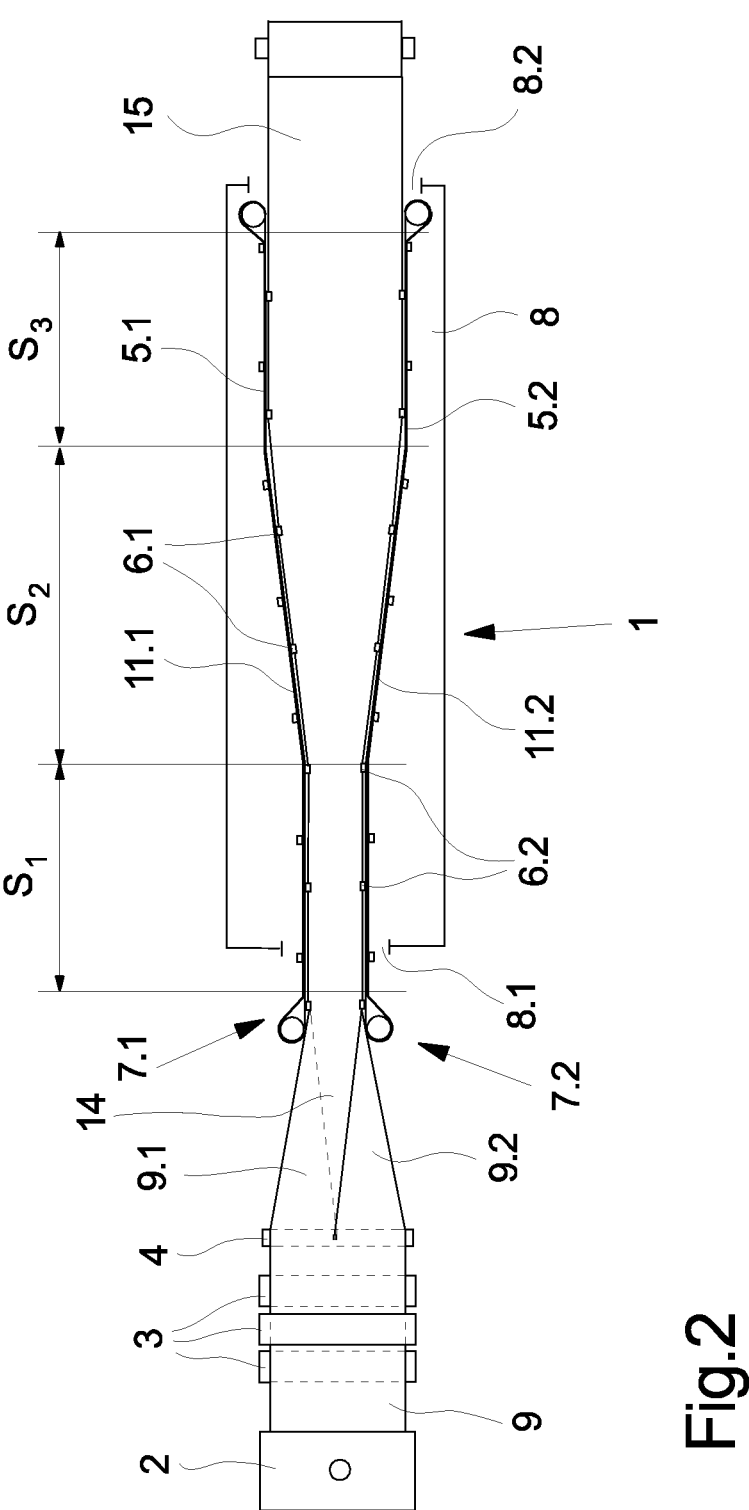
FIG. 2 shows a schematic plan view of the exemplary embodiment of FIG. 1

FIG. 4.2 schematically show a plurality of exemplary embodiments of holding means for fixing a plurality of plastic films FIG. 1 and FIG. 2 schematically represent a first exemplary embodiment of the apparatus according to the invention for stretching plastic films in multiple views. FIG. 1 shows a schematic representation of a side view and FIG. 2 shows a schematic representation of a plan view of the apparatus according to the invention for stretching plastic films. If explicit reference is not made to one of the figures, the following description applies for both figures.

The exemplary embodiment of the apparatus according to the invention is denoted here by the reference 1 as a stretching apparatus. Only the components of such a stretching apparatus 1 that are essential for the invention are in this case schematically represented. The components of the stretching apparatus 1 that are not represented are well known in the prior art and are therefore not described here.

The stretching apparatus 1 comprises two elongated extension paths 5.1 and 5.2 arranged symmetrically with respect to one another. The extension paths 5.1 and 5.2 are held on a carrier frame (not represented here) and conventionally comprise a guide rail system for guiding a multiplicity of holding means 6, 6.1 and 6.2, which will be explained in more detail below.

As may be seen particularly from the representation in FIG. 2, the extension paths 5.1 and 5.2 are arranged symmetrically with respect to one another and form between them a plurality of path sections, which are identified in FIG. 2 by the references $S_1$, $S_2$ and $S_3$. In the path section $S_1$, the extension paths 5.1 and 5.2 are arranged parallel to one another. In the path section $S_2$, the extension paths 5.1 and 5.2 are oriented in a V-shape with respect to one another, before again running parallel to one another in the path section $S_3$. The extension paths 5.1 and 5.2 in this case enclose a plurality of treatment planes for guiding and stretching plastic films.

The holding means 6.1 and 6.2 provided for guiding and fixing the plastic films are respectively driven by a drive system 7.1 and 7.2. In this case, the holding means 6.1 and 6.2 are respectively arranged on a traction means 11.1 and 11.2. The traction means 11.1 and 11.2 may in this case respectively be formed by a revolving chain, belt or wall, on which the holding means 6.1 and 6.2 are arranged at a distance from one another. The holding means 6.1 and 6.2 face one another symmetrically in the extension paths 5.1 and 5.2 in order to be able to fix edges of the plastic films on their longitudinal sides.

As may be seen from the representation in FIG. 1, the traction means 11.2 is deflected at an infeed 14 by a drive wheel 12.2. At an opposite outfeed 15, the traction means 11.2 is guided by a deflecting wheel. The drive wheel 12.1 is driven by an electric motor 16.

The holding means 6.1 and 6.2 guided by the traction means 11.1 and 11.2 comprise one or more clamping positions for gripping the plastic films. In this regard, FIGS. 4.1 and 4.2 schematically represent possible variants of the holding means 6.1 and 6.2 for receiving and fixing the plastic film.

FIG. 4.1 represents a first variant of the holding means 6.1. In this case, each of the holding means 6.1 comprises an upper clamping position 17.1 and a lower clamping position 17.2. In each of the clamping positions 17.1 and 17.2, the edge of a film web can be fixed on its longitudinal sides. Thus, two plastic films may be guided synchronously above one another by the holding means 6.1. The upper clamping positions 17.1 in this case form an upper treatment plane 18.1 for a first plastic film. The lower clamping positions 17.2 on the holding means 6.1 form a lower treatment plane 18.2 for a second plastic film. In this case, the plastic films in the upper treatment plane 18.1 and in the lower treatment plane 18.2 may be guided at a distance parallel to one another by the holding means 6.1. The holding means 6.1 are to this end fastened on the traction means 11.1. The holding means 6.2 assigned to the traction means 11.2 are configured identically and merely arranged mirror-symmetrically with respect to the holding means 6.1.

FIG. 4.2 represents an alternative embodiment of the holding means 6.1. In this case, two groups of holding means 6.1 and 6.1' are fastened on the traction means 11.1. A first group of the holding means 6.1 comprises a lower clamping position 17.2. A directly neighboring holding means 6.1' comprises an upper clamping position 17.1. Thus, the upper treatment plane 18.1 is formed by the holding means 6.1'. The lower treatment plane 18.2 is spanned by the holding means 6.1. Two plastic films may thus be guided in each clamping position 17.1 and 17.2.

In the case in which the holding means 6.1 and 6.1' are arranged together on a traction means 11.1, the respectively clamped and fixed plastic films may be guided synchronously. In the case in which the holding means 6.1 and 6.1' are respectively held on separate traction means, it is also possible for the plastic film in the lower treatment plane 18.1 and the plastic film on the upper treatment plane 18.1 to be guided with different transport speeds. To this end, the holding means 6.1 and 6.1' are respectively assigned separate drive systems.

As may be seen from the representation in FIGS. 1 and 2, the extension paths 5.1 and 5.2 are for the most part arranged inside an oven 8. The oven 8 comprises an entry 8.1 at a distance from an infeed 14. At the opposite end, the outfeed 15 is formed with the exit 8.2 of the oven 8. The oven 8 comprises heating means (not represented here), for example in order to allow thermal regulation of the plastic films by heated air.

In the exemplary embodiment represented in FIGS. 1 and 2, the stretching apparatus 1 is preceded by an extrusion apparatus 2. The extrusion apparatus 2 has an extrusion nozzle on its lower side in order to extrude a flat film from a supplied polymer melt, for example a polyester or polyolefin. The melt could in this case be generated by an extruder or directly by polycondensation, which would precede the extrusion apparatus 2. The extrusion apparatus 2 is followed by a plurality of guide rolls 3 in order to draw a stock film and optionally extend it in its length. A cutting device 4 is arranged between the stretching apparatus 1 and the guide rolls 3.

As may be seen from the representation in FIG. 2, the stock film 9 is divided into two plastic films 9.1 and 9.2 by the cutting device 4. The plastic films 9.1 and 9.2 formed from the stock film 9 are delivered at the infeed 14 of the stretching apparatus 1 to the holding means 6.1 and 6.2 and are gripped and clamped at a distance above one another in the relevant clamping positions of the holding means 6.1 and 6.2. The opening and closing of the clamping positions in the holding means 6.1 and 6.2 are conventionally carried out automatically by mechanical clamping means.

In FIGS. 1 and 2, the stretching apparatus 1 is represented in an operating situation in which the plastic films 9.1 and 9.2 are essentially stretched transversely. The plastic films 9.1 and 9.2 are initially heated to a stretching temperature in the path section $S_1$ of the extension paths 5.1 and 5.2 inside the oven 8. In the stretching section $S_2$ of the extension paths 5.1 and 5.2, transverse stretching of the two plastic films 9.1 and 9.2 is carried out. The holding means 6 are respectively driven synchronously by the assigned drive systems 7.1 and 7.2. In the path section $S_3$ of the extension paths 5.1 and 5.2, finishing of the plastic films 9.1 and 9.2 is carried out in order to relieve possible stresses in the material.

Subsequently, after the stretching, the plastic films 9.1 and 9.2 are delivered to a treatment apparatus. In this case, two winding apparatuses 10.1 and 10.2 are provided in order to wind the plastic films 9.1 and 9.2 separately. In this case, the physical properties on the two plastic films 9.1 and 9.2 are formed substantially and uniformly. At the outfeed 15 of the stretching apparatus 1, the clamping positions in the holding means 6.1 and 6.2 are automatically released so that the plastic films 9.1 and 9.2 are freed for the winding. The holding means 6.1 and 6.2 are guided back from the outfeed 15 to the infeed 14 by the traction means 11.1 and 11.2 after releasing the plastic films 9.1 and 9.2. In the exemplary embodiment represented in FIGS. 1 and 2, the return guiding of the holding means 6 is arranged inside the oven 8. In principle, however, it is also possible to feed the holding means 6 on the traction means 11.1 and 11.2 back to the infeed 14 outside the oven 8.

The exemplary embodiment of the stretching apparatus 1 according to the invention as represented in FIGS. 1 and 2 is particularly suitable in combination with an extrusion apparatus 2 in order to achieve continuous production processes for plastic films in compact units. In particular, the stretching apparatus 1 according to the invention can significantly shorten the conventional extension paths by the overlaid guiding of a plurality of plastic films. In particular, the path sections for stretching the plastic film can already be halved with simultaneous treatment of two plastic films.

Figure 3:
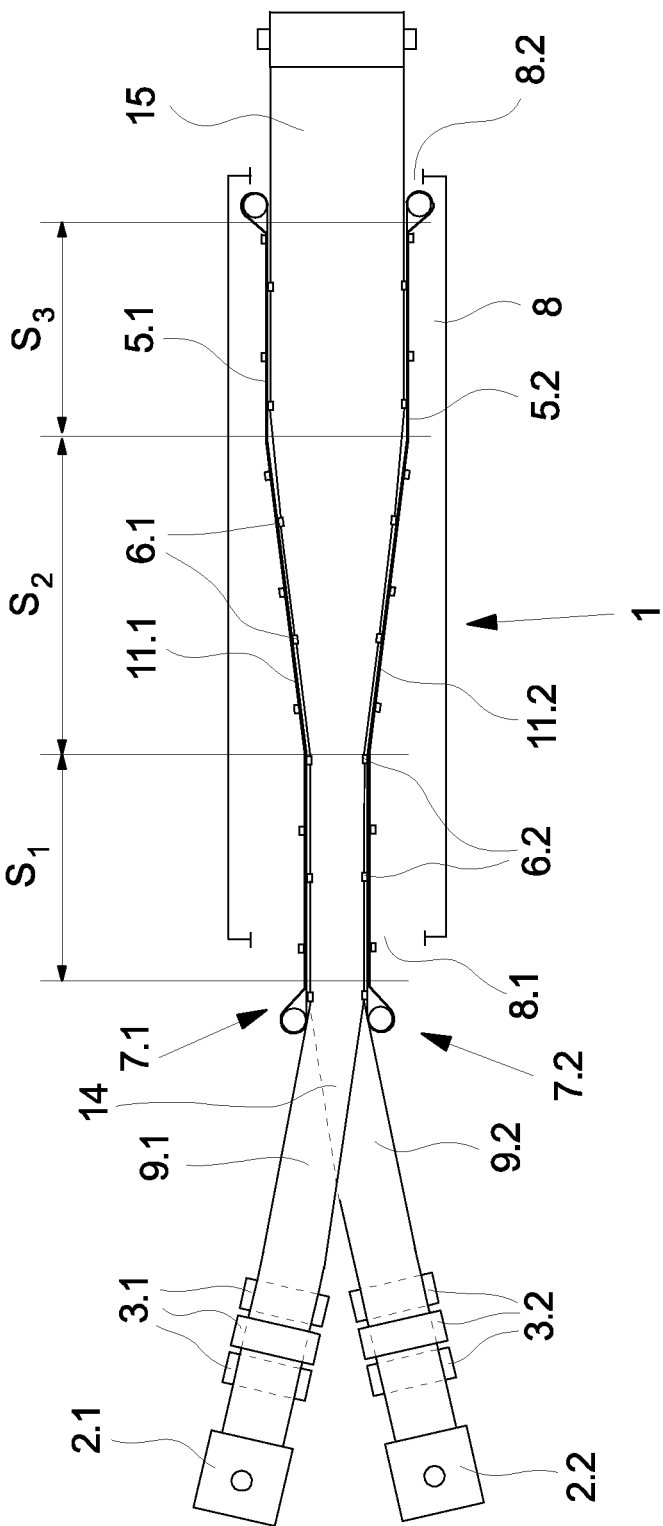
FIG. 3 shows a schematic plan view of another exemplary embodiment of the apparatus according to the invention for stretching plastic films

In order to increase the production output for the production of plastic films as much as possible, FIG. 3 represents another exemplary embodiment of the apparatus according to the invention in a schematic plan view. In the exemplary embodiment according to FIG. 3, the stretching apparatus 1 is identical to the exemplary embodiment according to FIGS. 1 and 2, so that at this point reference is made to the aforementioned description and only the differences will be explained.

In the exemplary embodiment according to FIG. 3, a plurality of extrusion apparatuses 2.1 and 2.2 are to the stretching apparatus 1. Each of the extrusion apparatuses 2.1 and 2.2 generates a plastic film 9.1 and 9.2 by means of its flat nozzle. The plastic films are guided by guide rolls 3.1 and 3.2 and delivered to the infeed 14 of the stretching apparatus 1. The plastic films 9.1 and 9.2 are gripped at a distance above one another at the infeed 14 of the stretching apparatus 1 by the holding means 6.1 and 6.2, and fixed on the edges of their longitudinal sides by clamping. The guiding, the heat treatment and the transverse stretching are preferably carried out synchronously on the two plastic films 9.1 and 9.2. In principle, however, it is also possible to guide the plastic films 9.1 and 9.2 with different transport speeds by separate holding means 6.1 and 6.2 according to the exemplary embodiment according to FIG. 4.2 and separate drive systems 7.1 and 7.2, in order to obtain different physical properties in the plastic films.

At the end of the process, the plastic films 9.1 and 9.2 are wound in the winding apparatuses 10.1 and 10.2.

In the exemplary embodiments represented in FIGS. 1 to 3, the stretching apparatus 1 is represented in a version in which two plastic films are stretched at a distance above one another on two neighboring treatment planes. In principle, the number of films guided simultaneously is not restricted, so that even a plurality of films may be guided above one another inside the stretching apparatus 1. Furthermore, the invention is not restricted to continuous processes and continuously operating stretching apparatuses. In principle, plastic films may also be stretched longitudinally and/or transversely in two-stage processes by the method according to the invention with the apparatus according to the invention. Thus, it is known to arrange such holding means inside a stretching frame in order to fix a plastic film and stretch it by moving the holding means. By using the apparatus according to the invention, a plurality of plastic films may therefore be stretched synchronously.

The invention claimed is:

1. A method for stretching plastic films, in which a plastic film is held on at least two opposite longitudinal sides by a multiplicity of holding means, and in which the holding means are guided on both longitudinal sides of the plastic film along extension paths, wherein a plurality of plastic films is formed by dividing a stock film in a continuous extrusion process, and wherein the plastic films are held at a distance above one another and stretched simultaneously by the holding means, wherein the plastic films are stretched longitudinally and transversely by moving the holding means along the extension paths, wherein the holding means are arranged successively along the extension paths to alternately comprise a lower clamping position and an upper clamping position, wherein the method further comprises the step of respectively fixing one plastic film per clamping position.

2. The method as claimed in claim 1, wherein the plastic films are stretched synchronously by moving the holding means along the extension paths.

3. The method as claimed in claim 1, wherein the plastic films are stretched inside an oven.

4. The method as claimed in claim 1, wherein the holding means assigned to one of the longitudinal sides of the plastic films are guided together by a drive system along the relevant extension path.

5. An apparatus for stretching plastic films, having a plurality of holding means, which are arranged distributed in a symmetrical arrangement along extension paths and are movable in such a way that a plastic film can be guided on both longitudinal sides, wherein the holding means are configured in terms of their number and/or their layout in such a way that a plurality of plastic films can be stretched simultaneously at a distance above one another, wherein an extrusion apparatus for producing a stock film and a cutting device are provided, by which a stock film can be divided into a plurality of plastic films and delivered to the holding means, wherein the extension paths comprise a plurality of path sections for guiding the holding means, and in that at least one of the path sections causes a longitudinal extension of the plastic films and a transverse extension of the plastic films, wherein the holding means are arranged successively along the extension paths to alternately comprise a lower clamping position and an upper clamping position, and wherein said lower and upper clamping positions are configured to respectively fix one of said plurality of plastic films.

6. The apparatus as claimed in claim 5, wherein the holding means are guided synchronously in the two extension paths by separate drive systems.

7. The apparatus as claimed in claim 5, wherein the extension paths are arranged inside an oven.

\* \* \* \* \*